US012677743B2

(12) United States Patent
Fay, II

(10) Patent No.: US 12,677,743 B2
(45) Date of Patent: Jul. 14, 2026

(54) MOWER FOLDING FLAIL CURTAIN

(71) Applicant: CNH Industrial America LLC, New Holland, PA (US)

(72) Inventor: Jeffrey Fay, II, Oxford, PA (US)

(73) Assignee: CNH Industrial America LLC, New Holland, PA (US)

( * ) Notice: Subject to any disclaimer, the term of this patent is extended or adjusted under 35 U.S.C. 154(b) by 378 days.

(21) Appl. No.: 18/234,476

(22) Filed: Aug. 16, 2023

(65) Prior Publication Data

US 2025/0057065 A1     Feb. 20, 2025

(51) Int. Cl.
| | |
|---|---|
| *A01D 75/00* | (2006.01) |
| *A01D 67/00* | (2006.01) |
| *A01D 75/18* | (2006.01) |
| *A01D 75/20* | (2006.01) |

(52) U.S. Cl.
CPC ............. *A01D 75/00* (2013.01); *A01D 67/00* (2013.01); *A01D 75/18* (2013.01); *A01D 75/20* (2013.01)

(58) Field of Classification Search
CPC ........ A01B 73/02; A01D 43/10; A01D 67/00; A01D 75/18; A01D 34/001; A01D 34/18; A01D 75/00; A01D 75/20
See application file for complete search history.

(56) References Cited

U.S. PATENT DOCUMENTS

| | | | |
|---|---|---|---|
| 9,179,592 | B2 | 11/2015 | Snider et al. |
| 10,631,452 | B2 | 4/2020 | Fay |
| 2019/0200511 | A1 * | 7/2019 | Fay, II ................. A01B 73/048 |
| 2019/0364736 | A1 * | 12/2019 | Lauff .................. A01D 43/082 |
| 2021/0298219 | A1 | 9/2021 | Fay |
| 2024/0049632 | A1 * | 2/2024 | Kappelman ............ A01D 75/18 |

FOREIGN PATENT DOCUMENTS

WO     WO-2010120197 A2 * 10/2010 ........... A01D 34/535

* cited by examiner

*Primary Examiner* — Brad Harcourt
(74) *Attorney, Agent, or Firm* — CM Law PLLC; Stephen J. Weed

(57) ABSTRACT

A stowable flail curtain for blocking debris flailed by a conditioner of an agricultural mower when in use. The flail curtain includes a sheet of material, a first arched support arm coupled between the sheet at a first attachment point and the trail frame, a second arched support arm coupled between the sheet at a second attachment point and the trail frame, and first and second actuation mechanisms coupled to the first and second arched support arms, respectively, and to the trail frame to move the sheet between a deployed position that blocks debris flailed by the conditioner when in use and a stowed position under the trail frame.

20 Claims, 9 Drawing Sheets

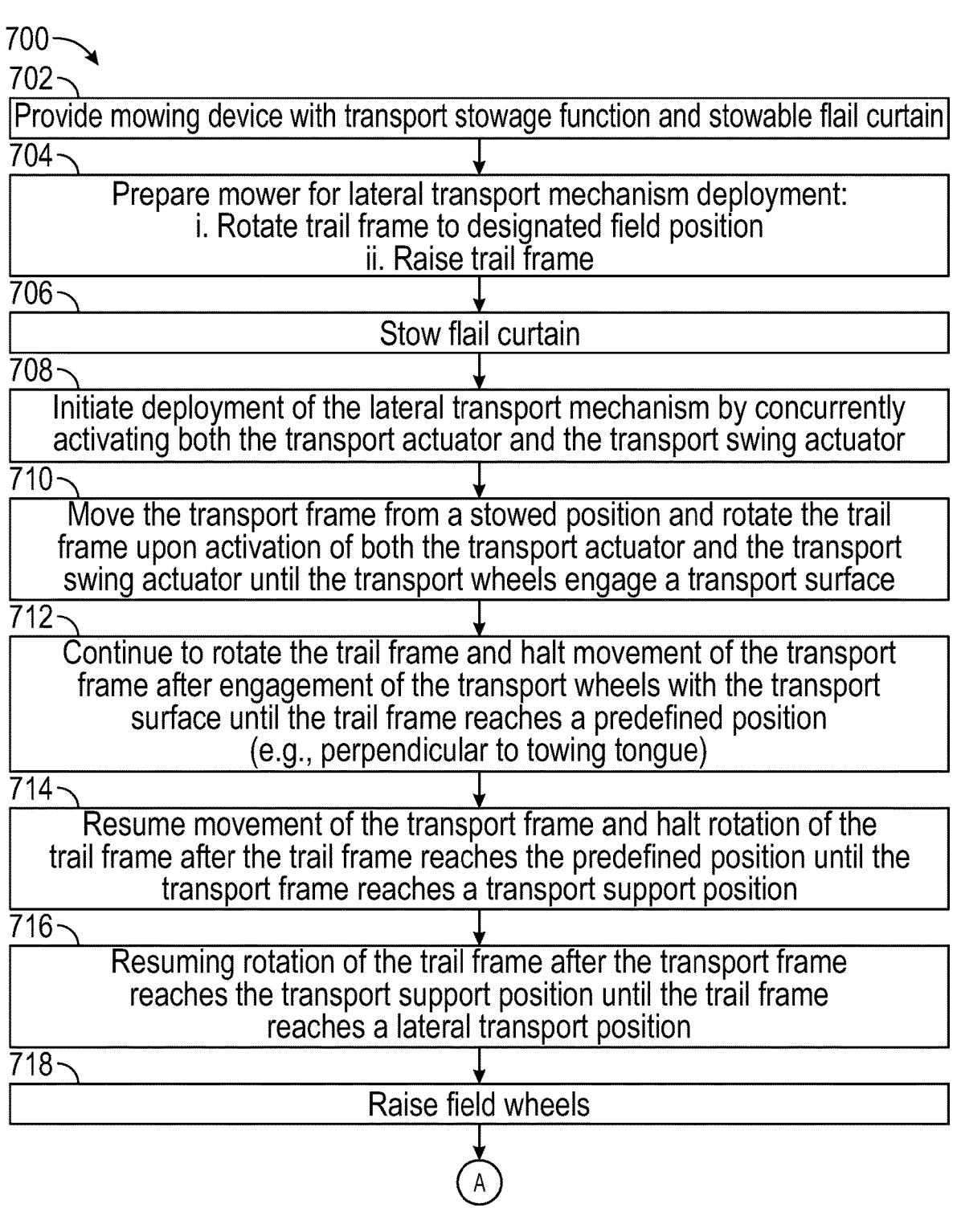

700

702
Provide mowing device with transport stowage function and stowable flail curtain 704
Prepare mower for lateral transport mechanism deployment:
i. Rotate trail frame to designated field position
ii. Raise trail frame 706
Stow flail curtain 708
Initiate deployment of the lateral transport mechanism by concurrently activating both the transport actuator and the transport swing actuator 710
Move the transport frame from a stowed position and rotate the trail frame upon activation of both the transport actuator and the transport swing actuator until the transport wheels engage a transport surface 712
Continue to rotate the trail frame and halt movement of the transport frame after engagement of the transport wheels with the transport surface until the trail frame reaches a predefined position
(e.g., perpendicular to towing tongue)

714
Resume movement of the transport frame and halt rotation of the trail frame after the trail frame reaches the predefined position until the transport frame reaches a transport support position 716
Resuming rotation of the trail frame after the transport frame reaches the transport support position until the trail frame reaches a lateral transport position 718
Raise field wheels

MOWER FOLDING FLAIL CURTAIN

BACKGROUND OF THE INVENTION

The present invention pertains to an agricultural mowing device and, more specifically, to a flail curtain configurable for use with a transport system for the agricultural mowing device.

A farmer may use an agricultural mowing device, such as a mower or mower conditioner, to cut crop material like hay or grass and deposit the cut crop material onto the field in windrows or swaths. Typically, the mowing device is towed behind an agricultural vehicle, such as a tractor.

A mowing device generally includes a towing tongue connectable to the tractor, a subframe, i.e., trail frame, a cutting device, and a transport system. The mowing device may additionally include a flail conditioner including a rotor with swinging flails that rotate at a high rate of speed, which may result in unwanted materials within the cut crop material such as rocks being expelled at a high velocity. A flail curtain may be positioned behind the mowing device conditioner to block these unwanted materials so that they drop back into the field.

The mowing device can be variously configured as a disc, sickle, or drum mowing device wherein the cutting device includes a series of rotatable discs, a sickle bar, or a rotating drum, respectively. In a disc-type mowing device, such as a Discbine®, the disc cutter bar may generally include multiple juxtaposed cutterheads for cutting the standing crop. Each cutterhead may consist of a rotating disc with diametrically opposed cutting blades or knives affixed to the body of the disc.

The transport system of a pull-behind mowing device is used to reduce the overall profile of the mowing device for transportation thereof. Generally, due to practical or regulatory limits, the width of the mowing device in its operating orientation prevents the towed transportation of the mowing device on farm lanes, roadways, or through gates. To reduce the width of the mowing device, the transport system may include a separate transport trailer or an integrated transport subframe with transport wheels that selectively support the mowing device.

The separate transport trailer may reorient the mowing device and carry the mowing device with its width extending along the longitudinal length of the transport trailer. In this regard, the mowing device is arranged parallel to the forward direction of travel of the towing vehicle. Such transport trailers may be useful; however, these transport trailers may add significant cost to the overall mowing operation. For instance, such transport trailers must be separately purchased, maintained, and transported between the various fields and farm headquarters, which increases the operating cost of a mowing operation.

Integrated transport systems typically include a pivotable subframe with wheels for selectively supporting the mowing device and multiple actuators for pivoting the mowing device to be parallel with the forward direction of travel of the towing vehicle. When transitioning between a field position and a transport position, components of the agricultural mowing device, such as the flail curtain, need to be considered.

What is needed in the art is a cost-effective and efficient flail curtain that is integratable into the lateral transport system of a mowing device.

BRIEF SUMMARY OF THE INVENTION

In accordance with some aspects, the techniques described herein relate to a flail curtain for use with a mowing device having a trail frame and a conditioner, wherein the conditioner flails debris when in use. The flail curtain includes a sheet of rigid material, a first arched support arm coupled between the sheet at a first attachment point and the trail frame, a second arched support arm coupled between the sheet at a second attachment point and the trail frame, and first and second actuation mechanisms coupled to the first and second arched support arms, respectively, and to the trail frame to move the sheet between a deployed position that blocks debris flailed by the conditioner when in use and a stowed position under the trail frame.

In accordance with some aspects, the techniques described herein relate to a method for actuating a lateral transport mechanism of a mowing device including a towing tongue, a trail frame rotatably coupled to the towing tongue, a conditioner, and a flail curtain, wherein the conditioner flails debris when in use. The lateral transport mechanism includes a transport frame supporting transport wheels, a transport actuator coupled between the towing tongue and the transport frame, and a transport swing actuator coupled between the trail frame and the towing tongue. The method includes stowing the flail curtain under the trail frame for transport of the mowing device by moving the flail curtain from a deployed position that blocks debris flailed by the conditioner when in use and a stowed position under the trail frame and deploying the flail curtain for field use by moving the flail curtain from a stowed position under the trail frame to a deployed position that blocks debris flailed by the conditioner when in use.

BRIEF DESCRIPTION OF THE SEVERAL VIEWS OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

Figure 1A:
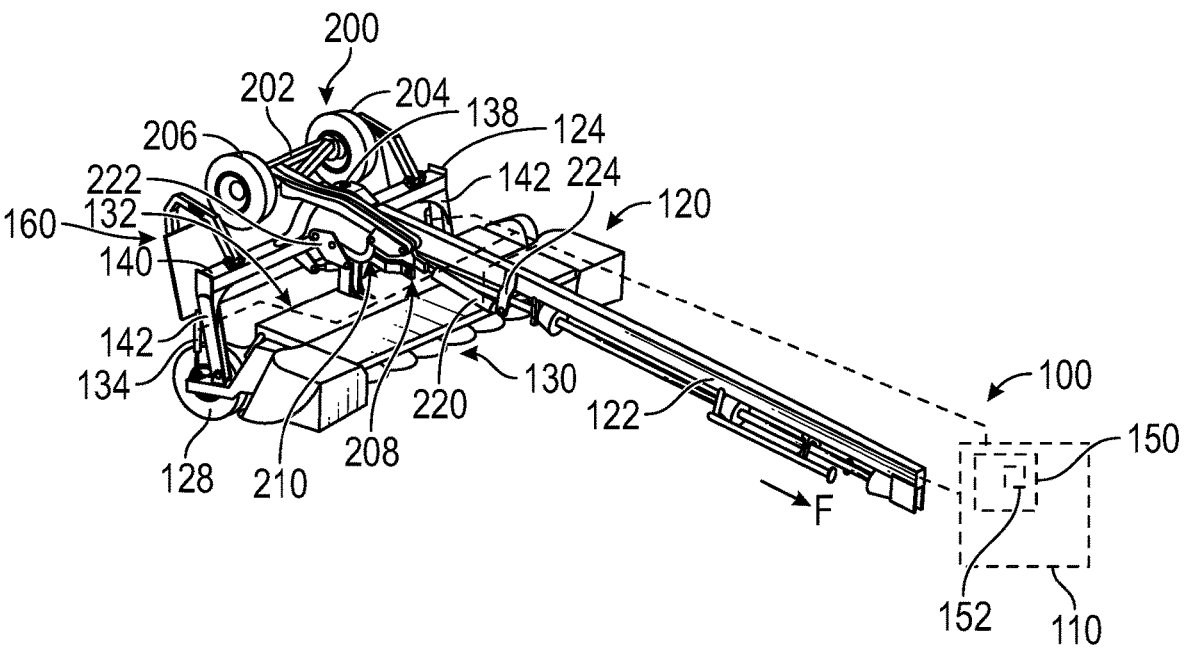
FIG. 1A is a perspective view of an exemplary embodiment of an agricultural mowing assembly with a flail curtain, the agricultural mowing assembly including an agricultural vehicle and a towed agricultural mowing device, the agricultural mowing device includes a towing tongue and a transport system connected to the towing tongue, and the agricultural mowing device with the flail curtain is shown to be in an intermediate field position, in accordance with an exemplary embodiment of the present invention.

The terms "forward", "rearward", "left" and "right", when used in connection with the agricultural mowing device and/or components thereof are usually determined with reference to the direction of forward operative travel of the towing vehicle, but they should not be construed as limiting. The terms "longitudinal" and "transverse" are determined with reference to the fore-and-aft direction.

Referring now to the drawings, and more particularly to FIGS. 1A, 1B, 2, 3, 4A-4D, and 5, there is shown an agricultural mowing assembly 100 that includes an agricultural vehicle 110 and an agricultural mowing device 120, which is towed by the agricultural vehicle 110 in a forward direction of travel F. The agricultural vehicle 110 generally includes a chassis, a prime mover, wheels and/or tracts, and a cab for housing the operator. The vehicle 110 can be in the form of any desired agricultural vehicle, such as a tractor or self-propelled windrower.

Figure 2:
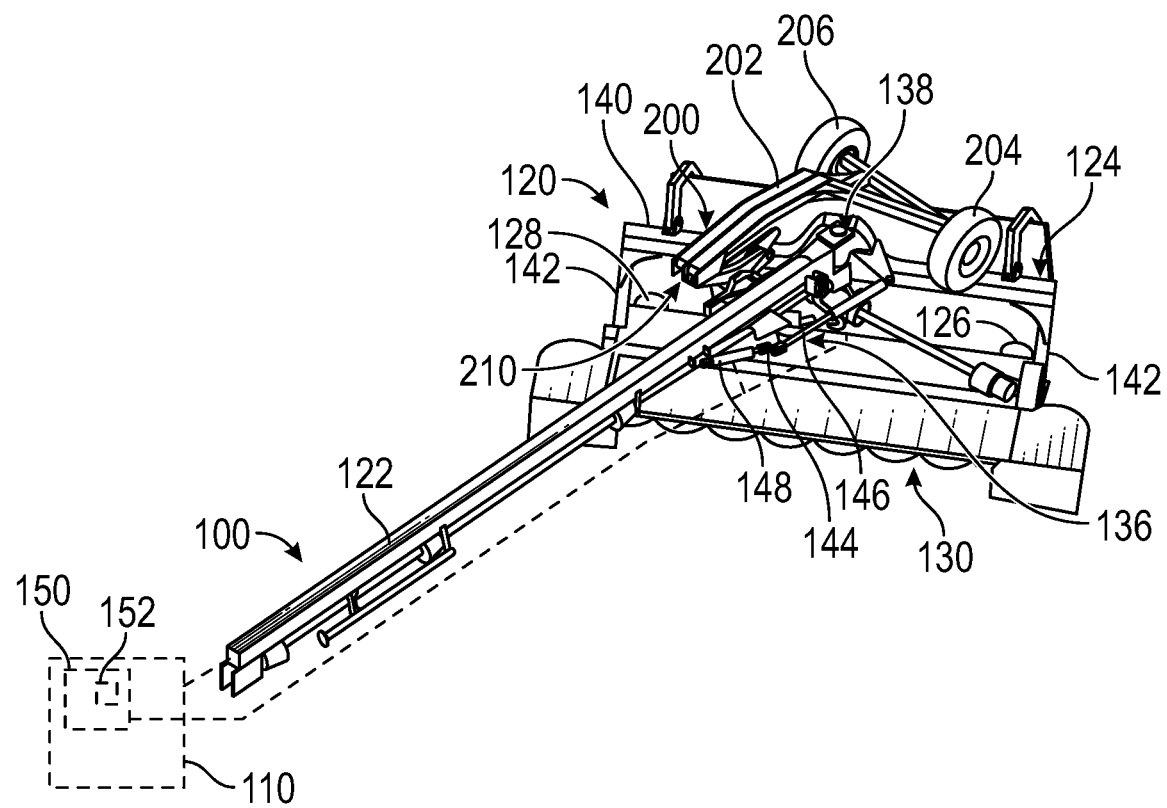
FIG. 2 is another perspective view of the agricultural mowing assembly of FIG. 1A, and the agricultural mowing device with the flail curtain is shown to be in a full field left position.
Figures 3, 4A:
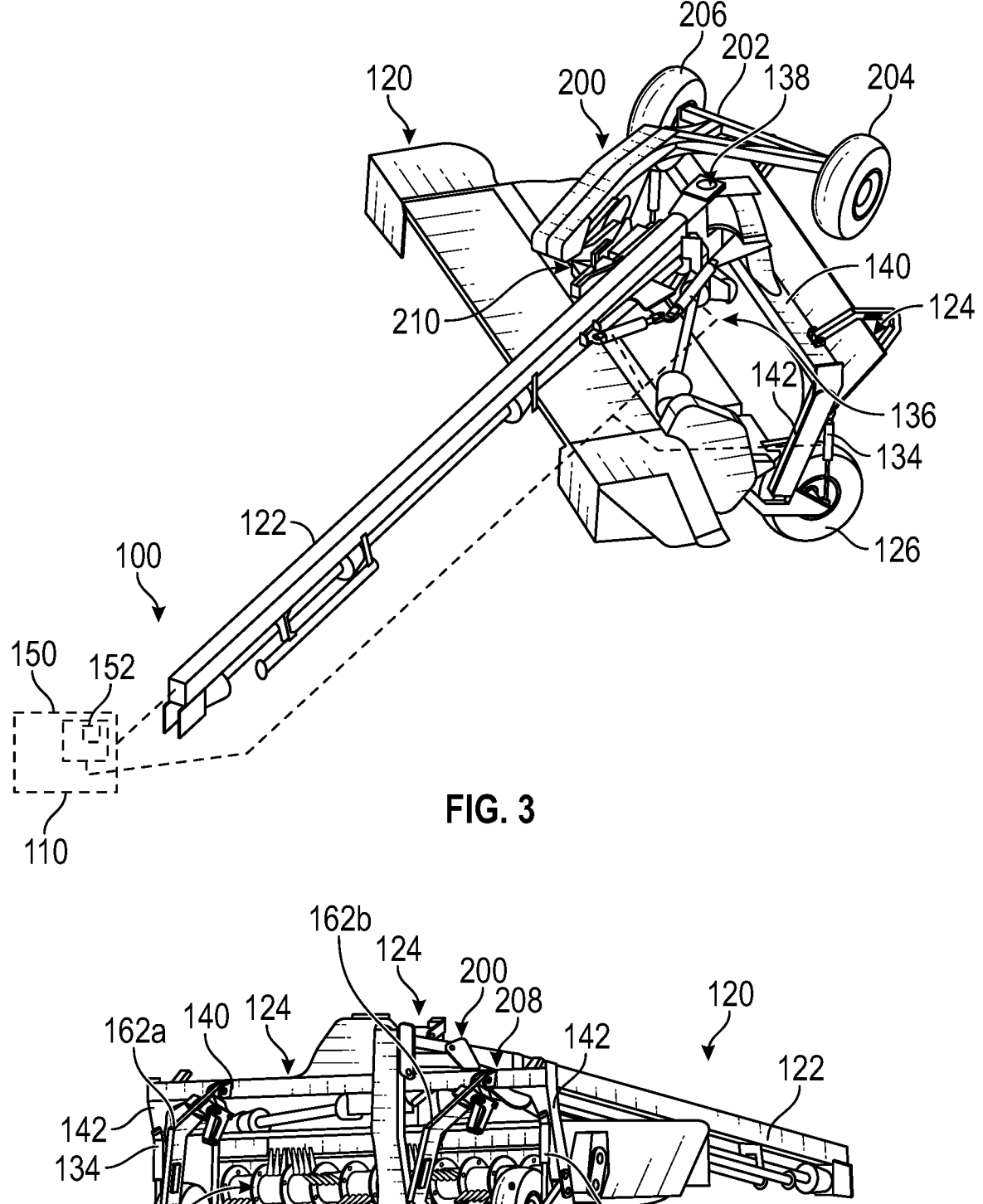
FIG. 3 is another perspective view of the agricultural mowing assembly of FIGS. 1A, 1B, and 2, and the agricultural mowing device with the flail curtain is shown in a full field right position.
FIG. 4A is a rear perspective view of the agricultural mowing device of FIGS. 1A, 1B, 2, and 3, with the transport system deployed and before lateral rotation of the trail frame.
Figure 5:
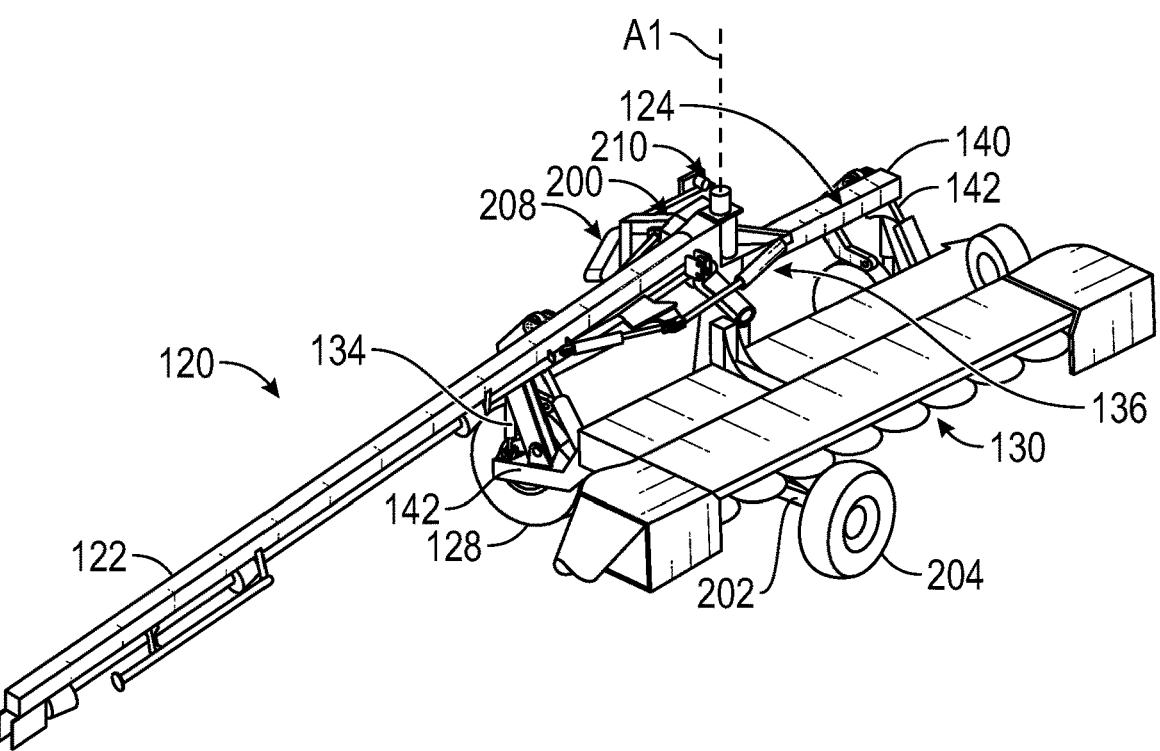
FIG. 5 is a side perspective view of the agricultural mowing device of FIGS. 1A, 1B, 2, 3, and 4A-4D, with the agricultural mowing device in a transport position wherein the flail curtain is stowed and the transport system is deployed for supporting the agricultural mowing device.

The mowing device 120 may be in the form of a center pivot mowing device or mowing device conditioner 120. As shown, the mowing device 120 is in the form of a center pivot mowing device conditioner 120. However, the mowing device 120 may be in the form of any desired mowing device. The mowing device 120 is configurable in a field position for cutting a crop material in the field (FIGS. 1A, 2, and 3) and a transport position for transporting the agricultural mowing device 120 (FIG. 5). The mowing device 120 may also be positioned between various field positions, such as an intermediate field position (FIG. 1A), a full field left position (FIG. 2), and a full field right position (FIG. 3).

The mowing device 120 may generally include a towing tongue 122 connected to the agricultural vehicle 110, a trail frame 124 rotatably connected to the towing tongue 122 about an axis of rotation A1, trail frame wheels 126, 128, a cutter bar 130, a crop conditioner in the form of a flail conditioner 132, a pair of lift actuators 134 operably connected in between the trail frame 124 and the trail frame wheels 126, 128, a trail frame actuating mechanism 136 for rotating the trail frame 124 and the cutter bar 130 therewith, and a lateral transport system 200 connected to the towing tongue 122 for selectively supporting the mowing device 120 in the transport position. The mowing device 120 may also include a controller 150, with a memory 152, for automatically controlling the trail frame actuating mechanism 136 and the transport system 200.

The towing tongue 122 removably connects to the agricultural vehicle 110. The towing tongue 122 has a first, proximal end and a second, distal end. The first end of the towing tongue 122 is connected to the agricultural vehicle 110. The second end of the towing tongue 122 rotatably mounts the trail frame 124 about the axis of rotation. The second end of the towing tongue 122 may rotatably mount the trail frame 124 via any desired mounting bracket 138. The towing tongue 122 may comprise any desired material, such as metal.

The trail frame 124 is rotatably connected to the towing tongue 122 via the mounting bracket 138 and the trail frame 124 accordingly rotates about the vertical axis of rotation A1. The trail frame 124 has a horizontal main beam 140 and a pair of vertical side beams 142 which downwardly extend from the main beam 140. The main beam 140 is rotatably connected to the towing tongue 122 about the axis of rotation A1. The main beam 140 is located underneath the transport system 200. The side beams 142 respectively rotatably mount the trail frame wheels 126, 128. The trail frame 124 supports the weight of the mowing device 120 in the field position but the trail frame 124 does not support the weight of the mowing device 120 in the transport position. Hence, the trail frame wheels 126, 128 support the trail frame 124 in the field position but do not support the trail frame 124, or any other component of the mowing device 120, in the transport position (FIG. 5). The trail frame 124 may comprise any desired shape and material.

The cutter bar 130 is connected to the trail frame 124. The cutter bar 130 cuts the crop material in the field position. The cutter bar 130 may be in the form of any desired cutter bar 130, such as a sickle bar or rotating disc cutter bar. The cutter bar 130 has a front end or edge and a back end or edge that is located behind the front end in the direction of crop material flow, i.e., opposite to the forward direction travel F. The front end of the cutter bar 130 defines a front longitudinal axis. It should be appreciated that the front edge of the cutter bar 130 may be defined by the front edge of the rock guards.

The flail conditioner 132 is located downstream of the cutter bar 130. The flail conditioner 132 condition the crop material as it exits the mowing device 120. The flail conditioner 132 may be in the form of any desired flail conditioner. As can be appreciated, the mowing device 120 may or may not include flail conditioner 132. In use, the flail conditioner 132 may flail debris (e.g., rocks) contained within the crop material.

A stowable flail curtain 160 is coupled to the trail frame 124. The stowable flail curtain 160 has a deployed position as illustrated in FIG. 1A and a stowed position (see FIGS. 4A and 5). When in the deployed position, the stowable flail curtain 160 is positioned to block debris flailed the flail conditioner 132. When in the stowed position, the stowable flail curtain 160 is stowed under the trail frame 124. The stowable flail curtain 160 may be releasably coupled to the trail frame 124 via fasteners such as bolts or more permanently coupled to the trail frame 124, e.g., via welding or formed as part of the trail frame 124.

Figure 1B:
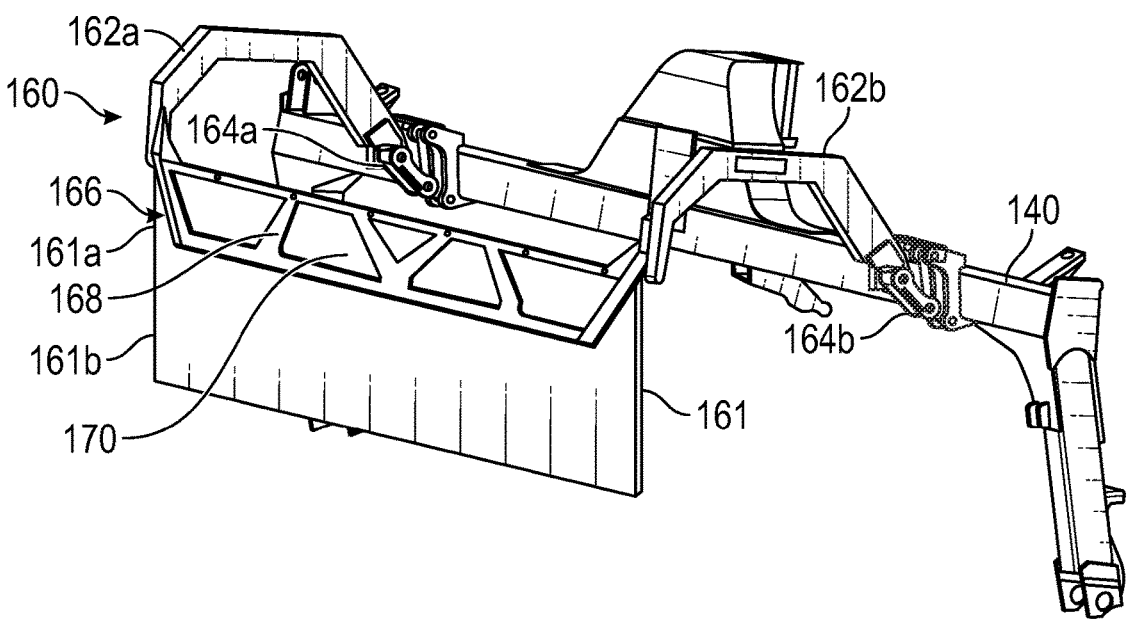
FIG. 1B is a perspective view of a portion of the agricultural mower assembly depicting an unobstructed view of the flail curtain of FIG. 1A in the intermediate field position.

FIG. 1B depicts components of the stowable flail curtain 160. The illustrated stowable flail curtain 160 includes a sheet 161 of semi-rigid material (e.g., ½ inch sheet of vulcanized rubber). The sheet 161 is attached to the trail frame 124 via arched support arms 162. A first arched support arm 162a is fixedly coupled on one end to the sheet 161 at a first position and is rotatably coupled on the other end to the trail frame 124. A second arched support arm 162b is fixedly coupled on one end to the sheet 161 at a second position and is rotatably coupled on the other end to the trail frame 124.

Actuation mechanisms 164 are coupled between the trail frame 124 and respective arched support arms 162. A first actuation mechanism 164*a* is coupled between the first arched support arm 162*a* and the trail frame 124 and a second actuation mechanism 164*b* is coupled between the second arched support arm 162*b* and the trail frame 124. The actuation mechanisms 164 move the respective arched support arms 162, which, in turn, move the stowable flail curtain 160 between the deployed position (see FIG. 1B) and the stowed position (see FIG. 4B).

Figure 4B:
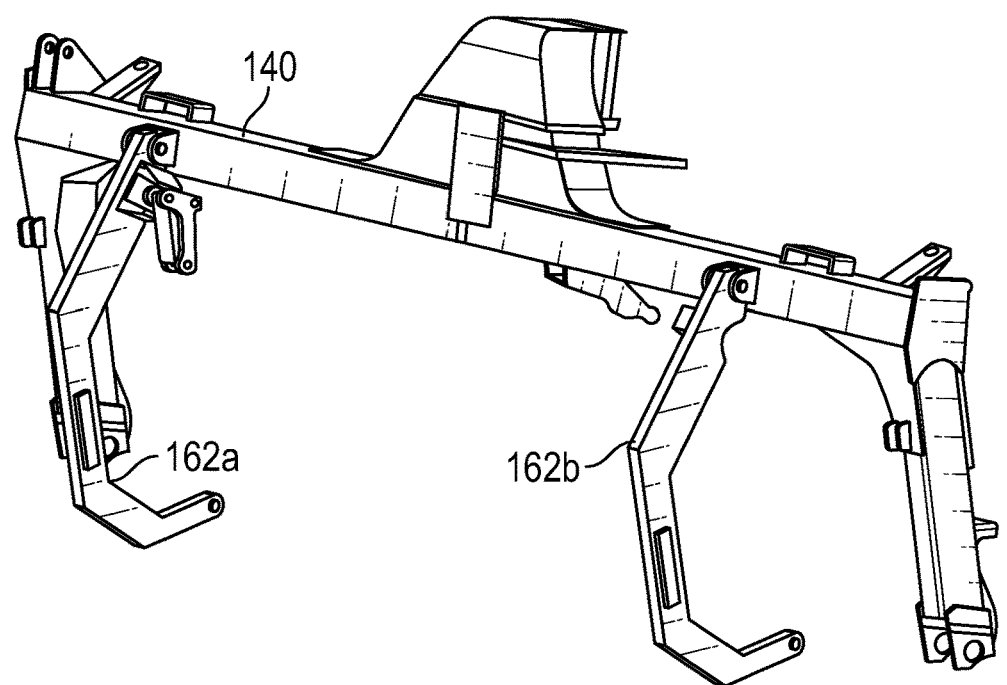
FIG. 4B is a rear perspective view of the trail frame and support arms of the flail curtain with the sheet of the flail curtain removed.
Figure 4C:
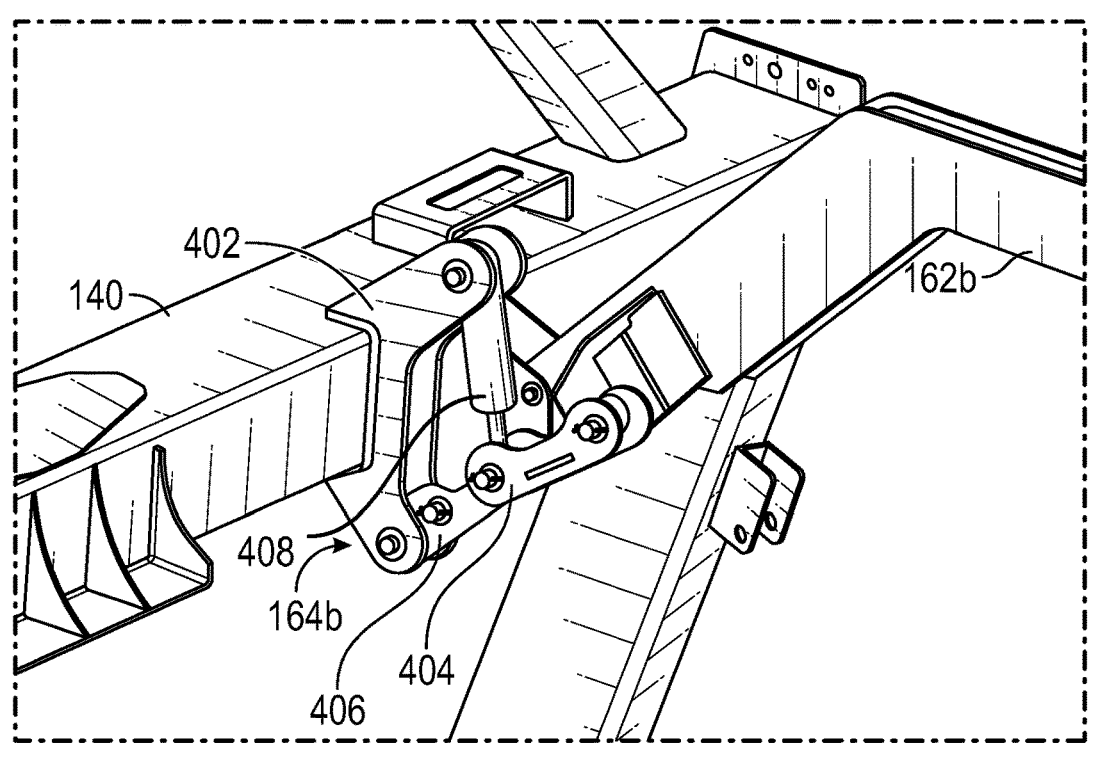
FIG. 4C is a perspective view of an actuation mechanism for the flail curtain coupled between the trail frame and a support arm of the flail curtain in a deployed position.
Figure 4D:
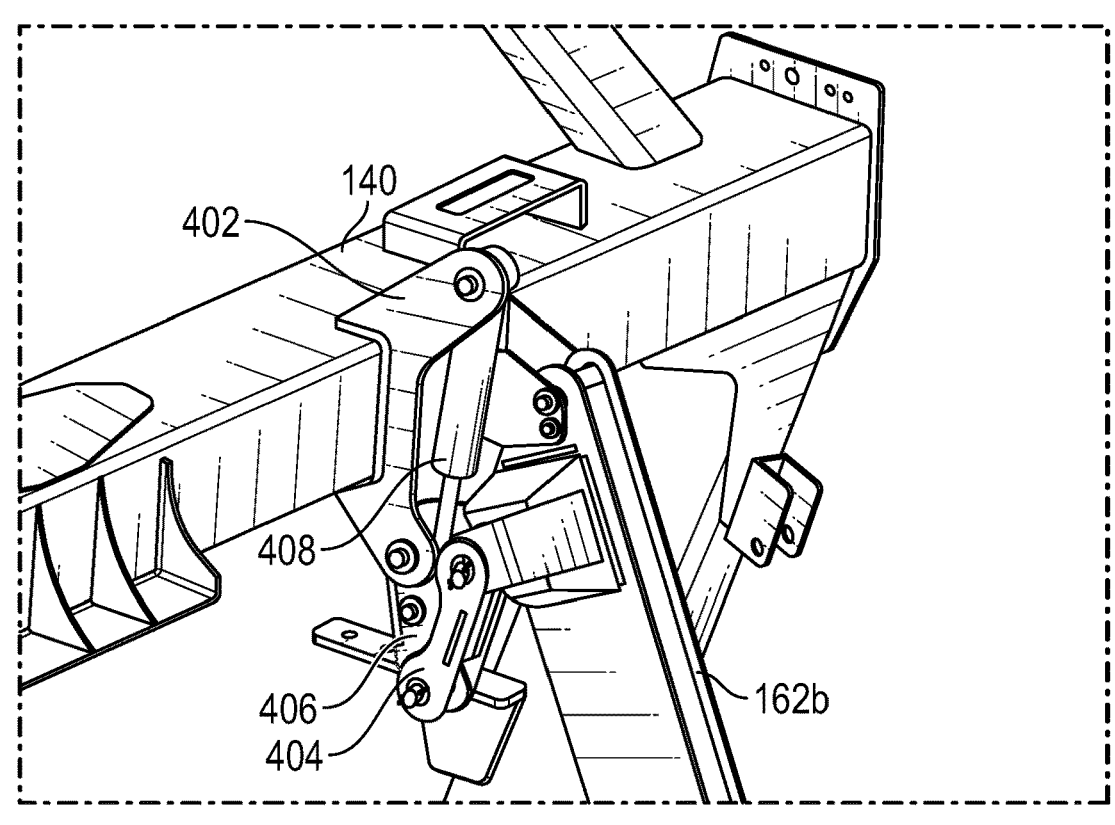
FIG. 4D is a perspective view of an actuation mechanism for the flail curtain coupled between the trail frame and a support arm of the flail curtain in a stowed position.

As illustrated in FIG. 4C, the actuation mechanisms 164 (the second actuation mechanism 164*b* depicted) each include a connector 402 coupling the actuation mechanism 164 to the trail frame 124, a first link 406 having a trail frame link end coupled to the connector 402 and a first connector end, a second link 404 having an arm link end coupled to the arched support arm 162*b* and a second connector end coupled to the first connector end, and an extendible actuator 408 coupled to the first and second connector ends. The connector 402 may be welded to the trail frame 124, secured in another manner, or formed as part of the trail frame 124.

The extendible actuator 408 includes a body and a piston or arm that extends from the body and is connected as its distal end to the first and second connector ends of the of the first and second links 406/404. The extendible actuator 408 is configured to extend the piston or arm to force the first and second connector ends away from the trail frame to move the flail curtain/sheet into the stowed position (see FIG. 4D). The extendible actuator 408 is configured to retract the piston or arm to force the first and second connector ends toward the trail frame 124 to move the flail curtain/sheet into the deployed position (see FIG. 4C). The extendible actuators 408 may be in the form of any desired hydraulic and/or electric cylinders. For example, the extendible actuators 408 may be in the form of hydraulic cylinders which are hydraulically connected to the hydraulic system of agricultural vehicle 110 via one or more fluid lines.

A support 166 extends in a first direction along an elongate edge of the sheet 161 and in a second direction perpendicular to the first direction along a planar surface of the sheet 161. The support 166 in the illustrated embodiment attaches the sheet 161 to the arched support arms 162. A first attachment point for attachment to the first arched support arm 162*a* is on a first end of the support 166 and a second attachment point for attachment to the second arched support arm 162*b* is on a second end of the support 166. In one example, the support 166 extends in the second direction between 20 percent and 30 percent of the sheet width to cover/support a first portion 161*a* of the sheet while a second portion 161*b* of the sheet 161 remains uncovered. The support may be a metal frame 168 with cutouts 170 to reduce weight. The support 166 provides added support to the stowable flail curtain 160 generally when in the stowed position such that the second portion 161*b* of the sheet 161 does not bend too far down and interfere with the transport system 200.

Referring back to FIG. 1A, the lift actuators 134 are respectively connected in between the trail frame 124 and the trail frame wheels 126, 128. More particularly, each lift actuator 134 is transversely connected in between the trail frame 124 and an extension bracket (unnumbered) of a respective trail frame wheel 126, 128. The lift actuators 134 pivot the trail frame wheels 126, 128 up or down to thereby raise or lower the trail frame 124, i.e., the rear of the mowing device 120. Thereby, the lift actuators 134 may create additional clearance or space for allowing stowage of the stowable flail curtain 160 and the transport system 200 to move into a position for supporting the mowing device 120. The lift actuators 134 may be in the form of any desired hydraulic and/or electric cylinders. For example, the lift actuators 134 may be in the form of hydraulic lift cylinders 134 which are hydraulically connected to the hydraulic system of agricultural vehicle 110 via one or more fluid lines.

The trail frame actuating mechanism 136 is operably connected in between the towing tongue 122 and the trail frame 124. The trail frame actuating mechanism 136 rotates the trail frame 124 in between its field positions for field operation and into its lateral position for transport. As used herein, the field right and left positions of the trail frame 124 may refer to any desired field-operating orientation of the trail frame 124 in which the trail frame 124 is not perpendicular to the towing tongue 122.

The trail frame actuating mechanism 136 includes a rotational link 144, a first trail frame actuator 146 (a field swing actuator), and a second trail frame actuator 148 (a transport swing actuator; FIG. 2). The rotational link 144 is rotatably connected to the towing tongue 122 and extends outwardly from the towing tongue 122. The rotational link 144 may be in the form of a flat plate. The rotational link 144 operably connects the first and second trail frame actuators 146, 148 to the towing tongue 122 at a location which is distally located away from the towing tongue 122 so that the first and second trail frame actuators 146, 148 may act in conjunction to swing the trail frame 124 between its field right and left positions and also rotate the trail frame 124 into and out of its lateral position in the transport position. The rotational link 144 is capable of rotating forwardly or rearwardly relative to the towing tongue 122 upon retraction or extension of the first and/or second trail frame actuators 146, 148.

The first trail frame actuator 146 is connected to the trail frame 124, via a corresponding bracket (unnumbered), and the rotational link 144. The second trail frame actuator 148 is connected to the towing tongue 122 and the rotational link 144. The first and/or second trail frame actuator 146, 148 may be used to rotate the trail frame 124 throughout any desired position of the trail frame 124. By way of example only, the first trail frame actuator 146 may be in the form of a field swing actuator 146 for rotating the trail frame 124 in between its field intermediate, right, and left positions. The second trail frame actuator 148 may be in the form of a transport swing actuator 148 for rotating the trail frame 124 in between its lateral position for transport and its extended, e.g., substantially perpendicular, field position for field operation. The first and second trail frame actuators 146, 148 may be in the form of any desired hydraulic and/or electric cylinders. For example, the first and second trail frame actuators 146, 148 may be in the form of hydraulic cylinders 146, 148 which are hydraulically connected to the hydraulic system of agricultural vehicle 110 via one or more fluid lines. As can be appreciated, the first and second trail frame actuators 146, 148 may or may not be identical actuators.

The transport system 200 supports the mowing device 120, e.g., the trail frame 124, the cutter bar 130, stowable flail curtain 160, and/or the towing tongue 122, in the transport position (FIG. 5) but does not support the mowing device 120 in the field position (FIGS. 1A, 1B, and 2). The transport system 200 includes a transport frame 202 rotatably connected to the towing tongue 122, transport wheels 204, 206 rotatably connected to the transport frame 202, and a transport actuating mechanism 208 for movably, i.e., rotatably, connecting the transport frame 202 to the towing tongue 122. Since the transport system 200 is connected to the side of the towing tongue 122, the transport system 200 does not move in conjunction with the trail frame 124. Also, the side or lateral location of the transport system 200 allows the weight of the mowing device 120 to be more evenly distributed between the transport wheels 204, 206.

The transport frame 202 is rotatable in between a retracted stowed position in the field position wherein the transport frame 202 is located above the trail frame 124 (FIGS. 1-3) and an extended support position in the transport position wherein the transport wheels 204, 206 support the trail frame 124 (FIG. 5) on a transport surface (e.g., the ground or a roadway). The transport frame 202 is rotatably connected to the towing tongue 122, via the transport actuating mechanism 208, at a location forward of the axis of rotation A1 of the trail frame 124 in the direction of forward travel F. Hence, the transport frame 202 is at least partially located in front of the axis of rotation A1 of the trail frame 124 in the direction of forward travel F in the field position, and the transport frame 202 is located rearwardly of the axis of rotation A1 of the trail frame 124 in the direction of forward travel F in the transport position. The transport frame 202 rotates about a substantially horizontal axis of rotation, plus or minus 30 degrees. Also, the connection point of the transport frame 202 is located vertically above the main beam 140 of the trail frame 124. Thus, the main beam 140 is located underneath the transport frame 202 in the field position such that the main beam 140 passes underneath the transport wheels 204, 206 when the transport frame 202 is in the retracted stowed position in the field position.

The transport frame 202 may include one or more beams which define a bent, elongated member and an axle for mounting the transport wheels 204, 206. Hence, the transport wheels 204, 206 are jointly mounted on a common axle. The transport frame 202 may comprise any desired shape and material.

The first and second transport wheels 204, 206 support the weight of the mowing device 120, e.g., the weight of the trail frame 124, the cutter bar 130, the stowable flail curtain 160, and/or the towing tongue 122, upon being fully deployed in the transport position of the mowing device 120. The first transport wheel 204 may be considered a front or left transport wheel 204, and the second transport wheel 206 may be considered a back or right transport wheel 206. The transport wheels 204, 206 may be identical and thus have the same material, size, and weight capacity. The transport wheels 204, 206 may comprise any desired wheels. The first transport wheel 204 is radially located closer to the axis of rotation A1 of the trail frame 124 than the front end of the cutter bar 130 in the transport position. Hence, both transport wheels 204, 206 are located behind the front longitudinal axis of the front end of the cutter bar 130, which in turn more evenly distributes the weight of the mowing device 120 between the front and rear transport wheels 204, 206.

The transport actuating mechanism 208 includes a linkage assembly 210, with multiple links (unnumbered), and a transport actuator 220 operably connected in between the towing tongue 122 and the transport frame 202, via the linkage assembly 210. The transport actuating mechanism 208 may also include one or more brackets 222, 224 for mounting the linkage assembly 210 and the transport actuator 220 to the side of the towing tongue 122. For instance, one bracket 222 may be in the form of an elongated bracket that extends outwardly and perpendicularly from the side of the towing tongue 122, and another bracket 224 may be in the form of a shorter actuator bracket 224 that is connected to the side of the towing tongue 122 in front of the location point of the elongated bracket 222. The linkage assembly 210 is rotatably connected in between the transport frame 202 and the towing tongue 122.

The linkage assembly 210 may include a first link connected in between the elongated bracket 222 and the transport frame 202, a second, upper link connected in between the elongated bracket 222 and the transport frame 202, a third link connected to the second link, and a fourth link connected to the elongated bracket 222, the third link, and the transport actuator 220. It should be appreciated that the linkage assembly 210 may include any desired number of links, such as two, three, four, five, or more links. The transport actuator 220 may be connected in between the linkage assembly 210, i.e., fourth link, and the towing tongue 122 via the actuator bracket 224. The transport actuator 220 may be in the form of any desired hydraulic and/or electrical cylinder. For instance, the transport actuator 220 may be in the form of a hydraulic cylinder 220 that is hydraulically connected to the hydraulic system of agricultural vehicle 110 via one or more fluid lines. The transport actuator 220 may be the only actuator for moving the transport frame 202.

The controller 150 is operably connected to the lift, trail frame, windrow shield, stowable flail curtain, and transport actuators 134, 146, 148, 630, 631, 220. The controller 150 may also be operably connected to a user interface within the cab of the agricultural vehicle 110. The controller 150 may automatically position the mowing device 120 in its transport position or field position upon the user inputting a corresponding command into the user interface. The controller 150 may be a standalone controller or integrated into the existing hardware and/or software of the agricultural vehicle 110 and/or mowing device 120.

Figure 6:
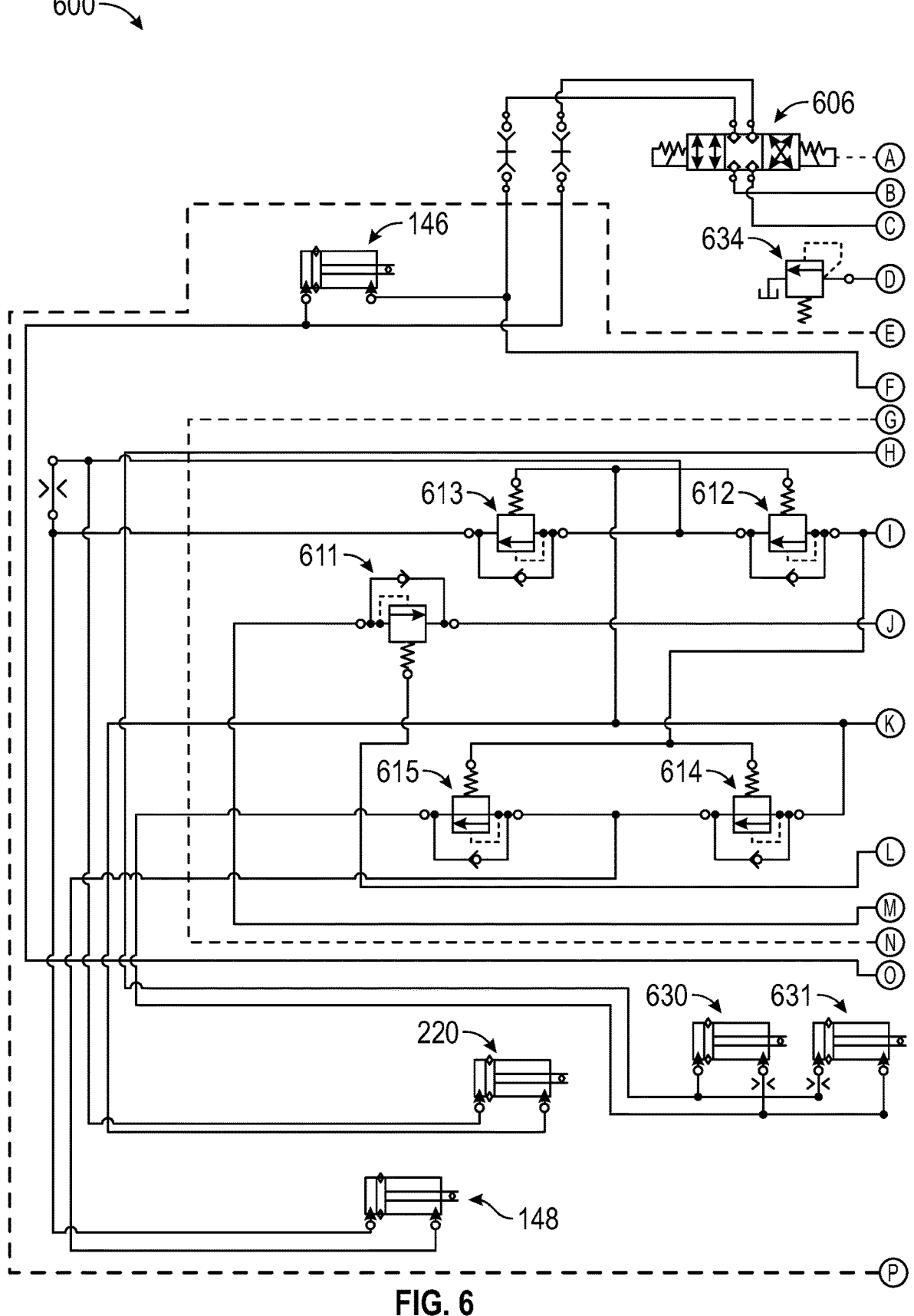
FIG. 6 illustrates a schematic of an example hydraulic system of the agricultural mowing device of FIGS. 1A, 1B, 2, 3, 4A-4D, and 5.
Figure 6:
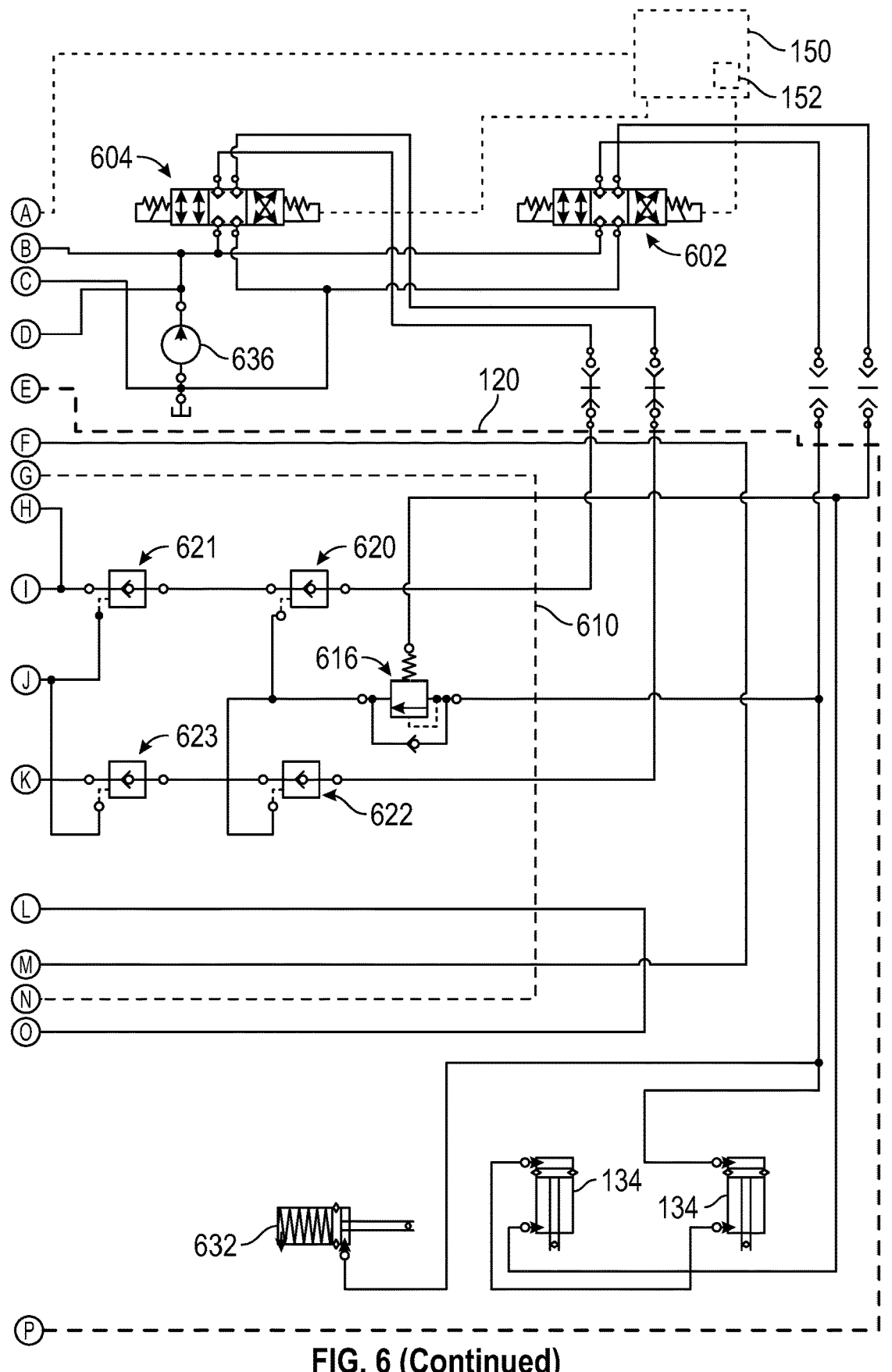

There is shown, in FIG. 6, an exemplary position and pressure-based hydraulic system 600 for the transport system 200. The hydraulic system 600 may generally include the lift actuators 134, the field swing actuator 146, the transport swing actuator 148, the windrow shield actuators 630, the flail curtain actuators 631, the transport actuator 220, and directional control valves 602, 604, 606, respectively, fluidly connected to the lift actuators 134, field and transport swing actuators 146, 148, windrow shield actuators 630, transport actuators 631, and the transport actuator 220. The directional control valves 602, 604, 606 may include a lift valve 602 fluidly connected to the lift actuators 134, a transport valve 604 fluidly connected to the transport swing actuator 148 and the transport actuator 220, and a swing valve 606 fluidly connected to the field swing actuator 146.

The lift, transport, and swing valves 602, 604, 606 may be operably connected to the controller 150. Thereby, the controller 150 may selectively activate the lift, transport, and swing valves 602, 604, 606 to position the mowing device 120 in between its field and transport positions. Accordingly, the hydraulic system 600 may include a lift function, a swing function, a transport deployment function, a transport stowage function for controlling the operation of the lift actuators 134, the field swing actuator 146, the transport swing actuator 148, the windrow shield actuators 630, the flail curtain actuators 631, and the transport actuator 220.

The hydraulic system 600 may also include a hydraulic manifold 610 with multiple hydraulic fluid lines, sequence valves 611, 612, 613, 614, 615, 616, and pilot operated check valves 620, 621, 622, 623. The hydraulic manifold 610 is fluidly connected in between the actuators 134, 146, 148, 631, 220 and their corresponding valves 602, 604, 606. The hydraulic system 600 may or may not include a windrow shield actuator 630, for folding the windrow shields in the transport position, and a tilt actuator 632 for tilting the mowing device 120. Furthermore, the hydraulic system 600 may include a relief valve 634, hydraulic pump 636, and multiple shuttle valves (unnumbered). The hydraulic system 600 may be incorporated as part of the agricultural vehicle 110 and/or the mowing device 120. For instance, the directional valves 602, 604, 606, hydraulic pump 636, and relief valve 634 may be positioned on the agricultural vehicle 110 and the hydraulic manifold 610 and actuators 134, 146, 148, 220 may be located on the mowing device 120. It should be appreciated that the hydraulic manifold 610 may be automatically and/or manually controlled. For instance, the hydraulic system 600 may include one or more hand-controlled inputs, e.g., levers, switches, etc., which the operator can manually operate to activate any desired component of the hydraulic system 600, such as the directional valves 602, 604, 606. In other instances, the hydraulic system 600 may include one or more electronic inputs, e.g., switches, logic gates, etc., which a computer system can actuate to activate one or more components of the hydraulic system 600, such as the directional valves 602, 604, 606.

The hydraulic system 600 has a built-in lockout feature wherein the flail curtain hydraulics, e.g., the flail curtain actuators 631, and the transport hydraulics, e.g., the transport swing actuator 148 and the transport actuator 220, and fluid lines thereof, are prevented from operating unless the field swing cylinder 146 is fully retracted in the full field right position of the mowing device 120 and the lift actuators 134 are fully extended in the fully elevated position of the mowing device 120. The check valves 620, 621, 622, 623 render the flail curtain actuator 631, the transport swing actuator 148, and the transport actuator 220 non-functional at any time when the lift actuators 134 are not fully extended and the field swing actuator 146 is not fully retracted. Thus, this lockout feature prevents stowage of the flail curtain 160 and the use of the transport system 200 during field operation, such as when mowing, or during roadway transport.

Furthermore, the hydraulic system 600 also ensures that the trail frame 124 cannot rotate in the wrong direction during the final stage of deploying the transport system 200, which may cause damage to the trail frame 124 and/or transport system 200. For instance, the lockout feature ensures that the trail frame 124 is located in its full field right position, as opposed to the field left or intermediate position, such that when the transport frame 202 is rotated downwardly it does not contact the trail frame 124, and once the transport frame 202 is fully deployed, the trail frame 124 is prevented from rotating in the wrong direction, which would cause the trail frame 124 to contact the transport frame 202.

To start the lift function of the hydraulic system 600 in order to raise the mowing device 120, the controller 150 will shift the lift valve 602 so that the lift actuators 134 start raising the trail frame 124. The extension of the actuators 134 will then trip the sequence valve 616 and open the check valves 620, 622. It is noted that if the mowing device 120 includes a tilt actuator 632, then the tilt cylinder will also retract upon raising the mowing device 120. To start the swing function of the hydraulic system 600 in order to position the mowing device 120 in its field positions, the controller 150 will shift the swing valve 606 to retract and/or extend the field swing actuator 146. This will then trip the sequence valve 611 and open the check valves 621, 623.

To start the transport deployment function of the hydraulic system 600, the controller 150 will fully extend the lift actuators 134, lock the lift valve 602, fully retract the field swing actuator 146, and lock the swing valve 606. The controller 150 then shifts and locks the valve 604 to begin transport deployment.

Transport deployment may begin with stowing of the stowable flail curtain 160 and (if equipped) retraction of the windrow shield(s). The stowable flail curtain 160 is stowed and the windrow shield(s) may be retracted in response to shifting of the valve 604, which allows hydraulic fluid flow to the flail curtain actuator 631 to stow the stowable flail curtain 160 and the windrow shield actuator 630 to retract the windrow shield(s). Sequence valves may be used to control the order of stowable and retraction.

The trail frame 124 and the transport frame 202 are then put into motion. In an example embodiment, the sequence valve 612 is tripped to concurrently extend the transport swing actuator 148 and the transport actuator 220 by providing hydraulic fluid flow thereto. Upon full extension of the transport swing actuator 148, the sequence valve 613 is tripped to channel full hydraulic fluid flow to the transport actuator 220 in order to speed up deployment of the transport frame 202.

After the transport frame 202 is deployed, the controller 150 will shift the transport valve 604 to the blocked position and will shift the swing valve 606 to fully extend the field swing actuator 146 in order to place the trail frame 124 in its full lateral transport position, wherein the trail frame 124 is substantially parallel to the towing tongue 122. The controller 150 will then shift the lift valve 602 to its lower position, and thereby the lift actuators 134 will retract and lift the field wheels 126, 128 upwardly to increase ground clearance.

During steady-state, i.e., constant, transport or road operation of the mowing device 120, the check valves 620, 621, 622, 623 will be closed, which disables transport hydraulic function during transport of the mowing device 120.

To start the transport stowage function of the hydraulic system 600, in a first stage transitioning from the deployed position to the stowed position of the transport system 200, the controller 150 will shift the lift valve 602 to extend the lift actuators 134, tripping the sequence valve 616 and opening the check valves 620, 622. The controller 150 will also shift the swing valve 606 to retract and pressurize the field swing actuator 146, tripping sequence valve 611 and opening the check valves 621, 623. Thereafter, the controller 150 will shift the transport valve 604 to provide hydraulic fluid flow through the check valves 622, 623. Then, the transport actuator 220 will retract. The transport valve 604 will remain locked in this position through stowage of the transport system 200.

During a second stage of the transport stowage function, the lift valve 602 and the swing valve 606 will remain locked, to keep the check valves 620, 622, 621, 623 open, and the transport valve 604 will remain locked. Once the transport actuator 220 has fully retracted, the sequence valve 614 will trip, which allows hydraulic fluid flow to retract the transport swing actuator 148.

During a third stage of the transport stowage function, the lift valve 602 and the swing valve 606 will remain locked, to keep the check valves 620, 622, 621, 623 open, and the transport valve 604 will remain locked. After the transport swing actuator 148 has fully retracted, the sequence valve 615 will trip, which allows hydraulic fluid flow through to retract the windrow shield actuator 630 and the flail curtain actuator 631.

During a fourth stage of the transport stowage function, the transport swing cylinder 148 has been completely retracted and the transport valve 604 shifts into its closed position by the controller 150. The controller 150 will also shift the lift valve 602 and the swing valve 606 to their respective closed position, thereby closing the check valves 620, 621, 622, 623 and locking out the transport hydraulics from operation. At the end of the fourth stage, the mowing device 120 may be in its full field right position.

Figure 7:
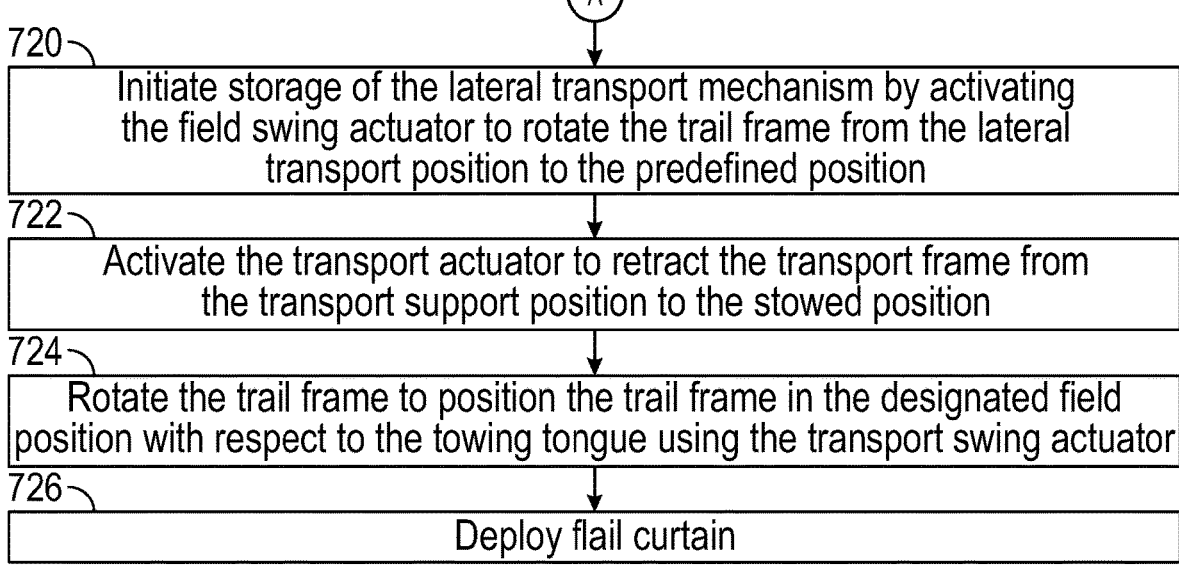
FIG. 7 illustrates a flow chart of an example method for operating the agricultural mowing assembly.

FIG. 7 depicts a flowchart of an exemplary method 700 for operating an agricultural mowing assembly 100 including a stowable flail curtain 160. The method 700 initially includes the step of providing the mowing device 120 with integrated transport system 200 (block 702) and stowable flail curtain 160. For ease of description, the method is described below with a control system (including the controller 150, sequence valves 611, 612, 613, 614, 615, 616, and pilot operated check valves 620, 621, 622, 623) performing the steps. As described herein, one or more of the steps may be performed manually.

At block 704, the controller system prepares the mowing device 120 to deploy the transport system 200. In an example implementation, the mowing device 120 has a lockout state that prevents the transport system from deploying until predefined conditions are met. These predefined conditions include rotating the trail frame 124 to a designated field position (e.g., full field right) and raising the trail frame 124 to a predefined height (e.g., its maximum height). In accordance with this example implementation, the control system prepares the mowing device 120 to deploy the lateral transport mechanism by rotating the trail frame 124 to the designated field position (block 704(*i*); e.g., by fully retracting the field swing actuator 146) and raising the trail frame 124 (block 704(*ii*); e.g., by fully extending the lift actuators 134).

At block 706, once the lockout conditions are met, the control system unlocks the transport hydraulics of the transport system 200 to allow deployment thereof. Initially, the stowable flail curtain 160 is stowed and, if equipped, the windrow shield(s), if equipped, is retracted. The stowable flail curtain 160 is stowed by activating the stowable flail curtain actuator(s) 631. If equipped, the windrow shield(s) is retracted by activating the window shield actuator(s) 630. The actuators 630/631 may be activated by sequence valves coupled to the respective actuator.

At block 708, the transport hydraulics for both the transport swing actuator 148 and the transport actuator 220 are concurrently activated to begin rotation of the trail frame 124 and deployment of the transport frame 202. Concurrent actuation is possible due to the relatively low pressure requirement for the initial actuation of the transport actuator 220, where the transport wheels are being moved from a first stored position to a second position in which the transport wheels contact the ground, and the relatively low pressure requirement to actuate the transport swing cylinder 148 to rotate the trail frame 124. The low pressure requirements allow higher flow into both cylinders at the same time, reducing cycle times compared to previous systems that fully extended the transport cylinder 220 prior to actuating the transport swing cylinder 148.

At block 710, the control system initiates movement of the transport frame 202 and rotation of the trail frame 124. The control system continues to move the transport frame 202 until it is partially deployed. In an example implementation, the control system continues moving the transport frame 202 until the transport wheels 204, 206 coupled to the transport frame 202 engage a transport surface (e.g., the ground or a roadway).

At block 712, the control system halts movement of the transport frame 202 (e.g., upon engagement of the transport surface) and continues to rotate the trail frame 124 until the transport swing actuator 148 reaches a predefined position (e.g., the trail frame 124 is substantially perpendicular to the towing tongue 122, plus or minus 30 degrees). In an example implementation, the trail frame 124 is substantially perpendicular to the towing tongue 122, plus or minus 30 degrees when the transport swing actuator 148 is fully extended, even though the field swing cylinder 146 remains fully retracted. Upon halting movement of the transport frame 202, energy used to move the transport frame is available to rotate the trail frame 124.

At block 714, the control system resumes movement of the transport frame 202 and halts rotation of trail frame 124 (e.g., upon reaching the predefined position). In an example implementation, the control system continues to move the transport frame 202 until it is fully deployed in an extended transport support position. Upon halting rotation of the trail frame 124, energy used to rotate the trail frame is available to move the transport frame 202.

At block 716, the control system resumes rotation of the trail frame 124 after the transport frame 202 halts (e.g., upon reaching the extended transport support position). In an example implementation, the control system continues to rotate the trail frame 124 until it is substantially aligned with the towing tongue 122, for example substantially parallel to the towing tongue 122, plus or minus 30 degrees, in order to reduce the overall width of the mowing device 120 for transport on a roadway. The control system may extend the field swing actuator 146 to complete the rotation of the trail frame 124 into a lateral position for transport.

At block 718, the control system raises the field wheels 126, 128. In an example implementation, the control system fully retracts the lift actuators 134 to raise the field wheels 126, 128 (with the sheet 161 of the stowable flail curtain 160 between the field frame 124 and the field wheels) in order to provide additional clearance during transportation of the mowing device.

At block 720, the control system initiates storage of the lateral transport mechanism, e.g., to return the mowing device 120 to a field position after transport. In an example implementation, the control system initiates storage by retracting the field swing actuator 146 to rotate the trail frame 124 from the lateral transport position to the predefined position (e.g., perpendicular to the towing tongue 122). This increases the overall width of the mowing device 120.

At block 722, the control system moves the transport frame 202 from its extended support position to its retracted stowed position. In an example implementation, the control system fully retracts the transport actuator 220 to move the transport frame 202 into its retracted stowed position.

At block 724, the control system positions the trail frame 124 in a designated field position (e.g., full field right). In an example implementation, the control system fully retracts that the transport swing cylinder 148 to position the trail frame 124 in the designated field position and complete the lateral transport storage process and place the mowing device in its filed position.

At block 726, the control system deploys the flail curtain and, if equipped, extends the windrow shield(s). In an example implementation, the control system fully retracts the flail curtain actuator 631 to position the sheet 161 for the stowable flail curtain 160 behind the conditioner 132 to block debris flailed by the conditioner when in use.

It should be appreciated that the operator may stay within the cab of the agricultural vehicle 110 while the method 700 is conducted by the controller 150. It should also be appreciated that the method 700 may be conducted manually by the operator, wherein the operator activates the directional valves 602, 604, 606 by hand.

It is to be understood that the steps of the method 700 may be performed by the controller 150 upon loading and executing software code or instructions which are tangibly stored on a non-transitory computer readable medium, such as on a magnetic medium, e.g., a computer hard drive, an optical medium, e.g., an optical disc, solid-state memory, e.g., flash memory, or other storage media known in the art. Thus, any of the functionality performed by the controller 150 described herein, such as the method 700, is implemented in software code or instructions which are tangibly stored on a tangible computer readable medium. The controller 150 loads the software code or instructions via a direct interface with the computer readable medium or via a wired and/or wireless network. Upon loading and executing such software code or instructions by the controller 150, the controller 150 may perform any of the functionality of the controller 150 described herein, including any steps of the method 700 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein but is intended to include all changes and modifications that are within the scope and spirit of the invention.

What is claimed is:

1. A flail curtain for use with a mowing device having a trail frame and a conditioner, wherein the conditioner flails debris when in use, the flail curtain comprising:
   a sheet of material;
   a first arched support arm coupled between the sheet at a first attachment point and the trail frame;
   a second arched support arm coupled between the sheet at a second attachment point and the trail frame; and
   first and second actuation mechanisms coupled to the first and second arched support arms, respectively, and to the trail frame to move the sheet between a deployed position that blocks debris flailed by the conditioner when in use and a stowed position under the trail frame.

2. The flail curtain of claim 1, further comprising:
   a support extending in a first direction along an elongate edge of the sheet and in a second direction perpendicular to the first direction along a planar surface of the sheet;
   wherein the first attachment point is on a first end of the support and the second attachment point is on a second end of the support; and
   wherein the support extends in the second direction between 20 percent and 30 percent of the sheet width.

3. The flail curtain of claim 1, wherein the first and second actuation mechanisms each comprise:
   a connector coupling the respective actuation mechanism to the trail frame;
   a first link having a trail frame link end coupled to the connector and a first connector end;
   a second link having an arm link end coupled to the arched support arm and a second connector end coupled to the first connector end; and
   an extendible actuator coupled to the first and second connector ends.

4. The flail curtain of claim 3, wherein the extendible actuator is a hydraulic cylinder.

5. The flail curtain of claim 3:
   wherein the extendible actuator extends to force the first and second connector ends away from the trail frame to move the sheet into the stowed position; and
   wherein the extendible actuator retracts to force the first and second connector ends toward the trail frame to move the sheet into the deployed position.

6. The flail curtain of claim 5, wherein the first link and the second link each have a longitudinal axis and the extendible actuator moves the first link and the second link through a relationship where the longitudinal axes are parallel when moving into the deployed position.

7. A mowing device comprising:
   the flail curtain of claim 1;
   a towing tongue;
   the trail frame, wherein the trail frame is rotatably coupled to the towing tongue; and
   a lateral transport mechanism comprising a transport frame supporting transport wheels, a transport actuator coupled between the towing tongue and the transport frame, and a transport swing actuator coupled between the trail frame and the towing tongue.

8. The mowing device of claim 7, wherein the lateral transport mechanism is configured to:
   stow the flail curtain under the trail frame for transport of the mowing device by moving the flail curtain from a deployed position that blocks debris flailed by the conditioner when in use and a stowed position under the trail frame; and
   deploy the flail curtain for field use by moving the flail curtain from a stowed position under the trail frame to a deployed position that blocks debris flailed by the conditioner when in use.

9. The mowing device of claim 8, wherein the first and second actuation mechanisms each comprise a connector coupling the respective actuation mechanism to the trail frame, a first link having a trail frame link end coupled to the connector and a first connector end, a second link having an arm link end coupled to the arched support arm and a second connector end coupled to the first connector end, and an actuator coupled to the first and second connector ends and wherein:
   to stow the flail curtain the actuator is extended to force the first and second connector ends away from the trail frame to move the sheet into the stowed position; and
   to deploy the flail curtain the actuator is retracted to force the first and second connector ends toward the trail frame to move the sheet into the deployed position.

10. A mowing device assembly, comprising:
    an agricultural vehicle; and
    the mowing device of claim 7 coupled to the agricultural vehicle.

11. The mowing device assembly of claim 10, further comprising:

a processor;

a memory; and instructions stored in the memory, the instructions, when executed by the processor, configure the mowing device assembly to stow the flail curtain under the trail frame.

12. A method for actuating a lateral transport mechanism of a mowing device comprising a towing tongue, a trail frame rotatably coupled to the towing tongue, a conditioner, and a flail curtain, wherein the conditioner flails debris when in use, the lateral transport mechanism comprising a transport frame supporting transport wheels, a transport actuator coupled between the towing tongue and the transport frame, and a transport swing actuator coupled between the trail frame and the towing tongue, the method comprising:

stowing the flail curtain in a stowed position under the trail frame for transport; and deploying the flail curtain in a deployed position for field use that blocks debris flailed by the conditioner by moving the flail curtain from under the trail frame to behind the trail frame with respect to a forward direction of travel.

13. The method of claim 12, wherein:

stowing the flail curtain for transport comprises moving the flail curtain from the deployed position that blocks debris flailed by the conditioner when in use to the stowed position under the trail frame.

14. The method of claim 13, wherein the mowing device further comprises a first support arm coupled between the flail curtain at a first attachment point and the trail frame, a second arched support arm coupled between the flail curtain at a second attachment point and the trail frame and first and second actuation mechanisms, wherein each actuation mechanism comprises a connector coupling the respective actuation mechanism to the trail frame, a first link having a trail frame link end coupled to the connector and a first connector end, a second link having an arm link end coupled to the arched support arm and a second connector end coupled to the first connector end, and an actuator coupled to the first and second connector ends and wherein:

stowing the flail curtain comprises extending the actuator to force the first and second connector ends away from the trail frame to move the flail curtain into the stowed position; and deploying the flail curtain comprises retracting the actuator to force the first and second connector ends toward the trail frame to move the flail curtain into the deployed position.

15. The method of claim 12, further comprising:

initiating deployment of the lateral transport mechanism after stowing the flail curtain.

16. The method of claim 15, wherein the initiating deployment comprises concurrently activating both the transport actuator to move the transport frame supporting the transport wheels and the transport swing actuator to rotate the trail frame.

17. The method of claim 16, further comprising:

moving the transport frame from the stowed position and rotating the trail frame upon activation of both the transport actuator and the transport swing actuator until the transport wheels engage a transport surface;

continuing to rotate the trail frame and halting movement of the transport frame after engagement of the transport wheels with the transport surface until the trail frame reaches a predefined position;

resuming movement of the transport frame and halting rotation of the trail frame after the trail frame reaches the predefined position until the transport frame reaches a transport support position; and resuming rotation of the trail frame after the transport frame reaches the transport support position until the trail frame reaches a lateral transport position.

18. The method of claim 17, wherein the mowing device further comprises a field swing actuator coupled between the towing tongue and the trail frame and wherein the stowing the flail curtain is conditioned on:

rotating the trail frame to position the trail frame in a designated field position with respect to the towing tongue using the field swing actuator.

19. The method of claim 18, wherein the mowing device further comprises field wheels coupled to the trail frame and at least one lift actuator coupled between the trail frame and the field wheels to move the trail frame relative to the field wheels and wherein the stowing the flail curtain is further conditioned on:

raising the trail frame to a predefined raised position with respect to the field wheels.

20. The method of claim 18, further comprising:

initiating storage of the lateral transport mechanism by activating the transport swing actuator to rotate the trail frame from the lateral transport position to the transport support position;

activating the transport actuator to retract the transport frame from the transport support position to the stowed position; and rotating the trail frame to position the trail frame in the designated field position with respect to the towing tongue using the transport swing actuator;

wherein the deploying the flail curtain occurs after the rotating the trail frame to position the trail frame in the designated field position.

* * * * *